INVENTORS.
RICHARD A. SALATHIEL,
VERNON R. PORTER
BY
ATTORNEY.

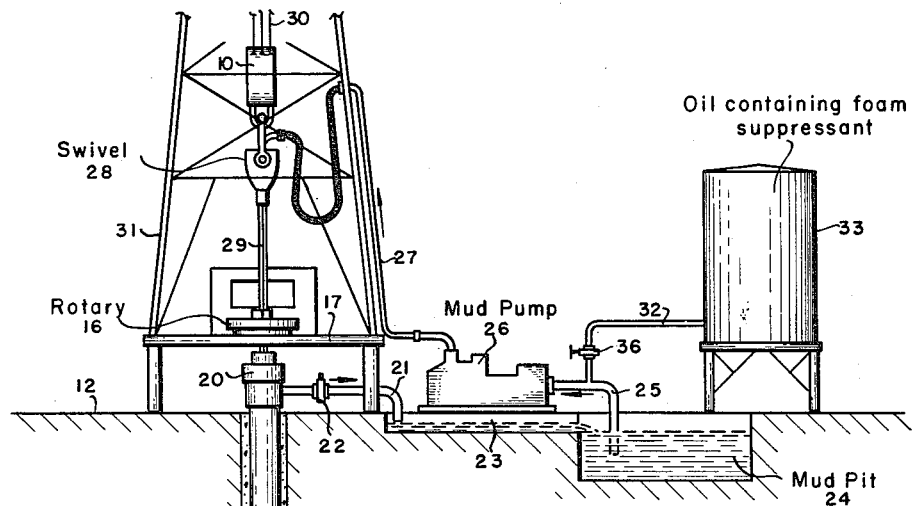

United States Patent Office 3,146,199
Patented Aug. 25, 1964

3,146,199
WATER BASE DRILLING FLUID AND METHOD OF DRILLING A WELL UTILIZING THE SAME
Richard Arthur Salathiel, Houston, and Vernon R. Porter, Denton, Tex., assignors, by mesne assignments, to Jersey Production Research Company, Tulsa, Okla., a corporation of Delaware
Filed Oct. 10, 1958, Ser. No. 766,510
26 Claims. (Cl. 252—8.5)

The present invention is directed to a fluid for use in wells. More particularly, the invention is directed to a drilling fluid which has improved properties. In its more specific aspects, the invention is directed to a composition for use in and a method of drilling wells.

The present invention may be briefly described as a composition suitable for use in wells which comprises a suspension of clay, an aqueous solution containing a water soluble salt of an alkaline earth metal in a sufficient amount to provide in said composition an amount of alkaline earth metal ion of at least 1800 p.p.m. and an amount of a ferro-chrome lignosulfonate sufficient to provide said composition with an API filtration rate of less than about 20 ml., in the composition having a pH within the range from about 7.5 to about 10.0 and a density in the range from about 8 to about 18 pounds per gallon.

The invention also may be described as a method for drilling a well in which a fluid is formed comprising a suspension of clay, an aqueous solution containing a water soluble salt of an alkaline earth metal to provide in the fluid an amount of alkaline earth metal ion of at least 1800 p.p.m. and an amount of ferro-chrome lignosulfonate sufficient to provide the fluid with an API filtration rate of less than about 20 ml., the fluid having a pH in the range from about 7.5 to about 10 and a density within the range from about 8 to about 18 pounds per gallon, the fluid being introduced and circulated in the well while drilling the well and thereby forming a filter cake on the wall of the well whereby enlargement of the bore of the well is suppressed and drilling rate is enhanced.

The water soluble salt of an alkaline earth metal may be a calcium, magnesium, barium, or strontium salt, which is water soluble. Preferably, the water soluble salt is a calcium salt. Illustrative of the water soluble salts are the chlorides, nitrates, acetates, formates, water soluble organic salts, and the like. Other of the alkaline earth metal salts which are not applicable in the practice of the present invention are the sulfates, carbonates, and phosphates. Likewise, the hydroxides may not be used in the practice of the present invention.

The amount of the water soluble alkaline earth metal salt employed in the present composition is sufficient to provide in the composition an alkaline earth metal ion in an amount at least 1800 p.p.m. with a suitable upper limit of about 40,000 p.p.m. Above a concentration of about 40,000 p.p.m. the desired fluid properties show deterioration while below about 1800 p.p.m., the fluid does not possess the desired characteristics. Actually, for the alkaline earth metals such as calcium, barium, and strontium, a sufficient amount should be employed to provide alkaline earth metal ion of at least 2000 p.p.m., which is preferred.

The clay employed in the present invention is suitably used in an amount of about 7 to about 70 pounds per barrel of the drilling fluid. The clay used is preferably a bentonitic clay, but any suitable clay may be used such as illites, montmorillonites, zeolites, attupulgites, natural clays, and other clays which function in a similar manner.

The clays are suitably suspended in water together with the other materials to form a drilling fluid having a density of about 8 to about 18 pounds per gallon. To achieve a fluid having a high density, it may be necessary to employ weighting agents such as those available to the market as illustrated by barites (barium sulfate), barium carbonate, ferric oxide, lead oxide, galena, and other inorganic and/or organic compounds, and the like, having a suitable density and which do not adversely affect the properties of the mud. While it is contemplated that an aqueous suspension of clay will form the base drilling mud of the present invention, it is contemplated that an oil-emulsion drilling fluid may be employed where both oil and water are present.

The pH of the improved fluid must be carefully controlled and is in the range from about 7.5 to about 10, with a preferred pH in the range from about 8 to about 9. Desirable results are obtained at a pH of about 8.5.

An essential ingredient of the fluid of the present invention is ferro-chrome lignosulfonate, which is manufactured by and available from the Puget Sound Pulp and Timber Company at Bellingham, Washington. This ferro-chrome lignosulfonate is marketed under the trade name of Q-Broxin. The Q-Broxin is employed in the present invention in an amount from about 5 to about 20 pounds per barrel of the fluid.

Important features and advantages of the present invention are that the present invention has improved and unusual qualities in that a drilling fluid is provided which forms a gel of constant strength within about one minute, whereas the conventional muds do not gel instantaneously and acquire gel strength only gradually. This in itself is an important characteristic since it prevents drill cuttings and weighting materials from dropping out of the drilling fluid and maintains them in suspension. Circulation is sometimes suspended in drilling operations for several hours for various reasons and if the mud gains strength over the period when drilling operations are suspended, unusual pressures may be required to induce circulation which may cause subsurface formations to be fractured, which is in itself quite undesirable. Also, the characteristics of the improved mud makes it easier to run tools and pipe into the hole.

Another feature of the present invention is that the calcium chloride and the Q-Broxin together provide fluid loss control for the drilling fluid in an alkaline medium such as the present invention provides.

Another important advantages of the present invention is that when drilling operations are conducted with the improved fluid, the filtrate which enters into or contacts the formation does not cause excessive swelling of the clays or shales which prevents the well bore from being washed out, as happens when a normal or conventional mud is employed since it is the swelling of clays and shales in the presence of mud that causes sloughing and hole enlargement. Thus in the practice of the present invention, the gauge of the well bore is substantially maintained because a minimum of swelling occurs, if any, and prevents washing out of the well bore as occurs when conventional muds are used.

The present invention will be further illustrated by reference to the drawing in which:

FIG. 1 is a partial sectional view illustrating a drilling operation employing the present invention;

FIG. 2 is a graph showing the relationship between API filtration rate and the concentration of Q-Broxin in the improved drilling fluid.

Figure 3:
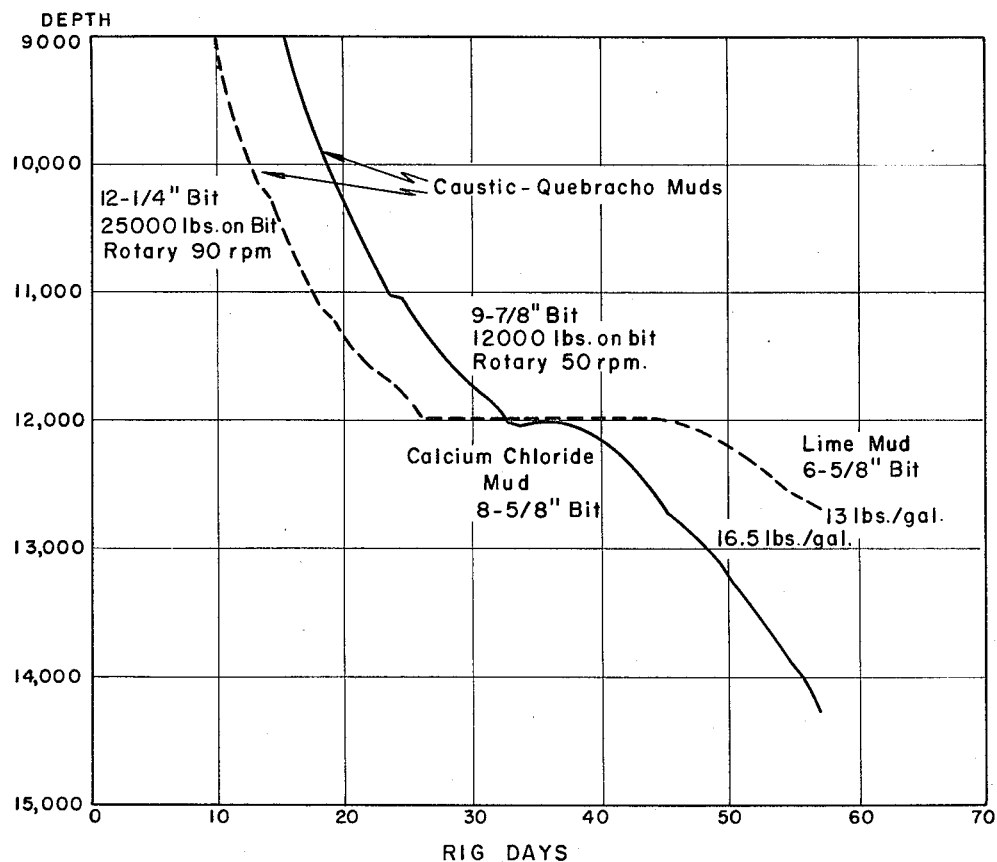
FIG. 3 shows the number of days taken to reach a given depth comparing the improved drilling fluid with other drilling fluids showing the rate of penetration.

Referring now to FIG. 1, numeral 11 designates a well bore drilled from the earth's surface 12 employing a drill string 13 which carries on its lower end a conventional drill bit 14, such as one of the rock or fish tail type, which is provided with a circulation port or eye 15 for discharge of drilling fluid into the well. The drilling string 13 extends into a rotary table 16 on the derrick floor 17.

Set in the well bore 11 is the usual surface casing 18 which is cemented in place with cement 19 with the surface casing closed with a well head 20 provided with a flow line 21 controlled by valve 22 for discharge into a mud returns ditch 23 communicating with a mud pit 24. Taking suction on the mud pit 24 is a mud line 25 which connects into a mud pump 26 from which the drilling mud is discharged by a line 27 into the swivel 28 and thence into the kelly 29 which transmits rotation to the drill string 13 by way of rotary table 16. The swivel 28 is gradually lowered by block 10 carried by the hoisting lines 30.

Connected into the mud line 25 is line 32 extending to tank 33 which contains an oil such as diesel oil, kerosene, and the like having a viscosity in the range from about 1.5 to about 200 centipoises at 70° F. This oil suitably contains a foam suppressant which preferably is aluminum stearate, but other metal salts of fatty acids such as the calcium, magnesium, aluminum, and lead salts of palmitic, oleic, and stearic acids may also be used.

In the drilling of the well by rotating the drill string 13 and circulating the drilling fluid of the present invention down the drilling string 13 through the eyes 15 in the drill bit and up the annulus 34 between the drill string and the wall of the well bore, a filter cake 35 is deposited on the borehole wall with filtrate from the drilling fluid entering into the formations pierced during drilling and thereby preventing sloughing and washing away of less competent formation material such as clays or shales which ordinarily would swell and then wash away.

In conducting the practice of the present invention it may be desirable to add from about 10% to about 15% by volume to the drilling fluid of the oil contained in tank 33 to aid in the circulation, and when this is desired, valve 36 in line 32 is opened, establishing communication with line 25 and pump 26 and taking suction on tank 33. This allows the circulation to be induced readily and the foam suppressant prevents foaming.

The present invention is quite advantageous for use in drilling operations since it is now the practice in well completions to use nonplugging completion emulsions as workover fluids. These nonplugging completion emulsions usually comprise or consist of oil emulsified with selected emulsifiers into strong calcium chloride solutions. Such emulsions find use in various workover operations, in oil and gas wells as in initial completions to protect the formation and the perforation from any damaging effects of mud or water. A wide use of the completion emulsions has been in perforating of wells such as with bullets or shaped charges to bring the well into production. Completions made with the emulsion in the casing opposite the zone to be perforated come into production quickly and easily with higher production potential than with comparable completions made with conventional mud or salt water in the hole. A great difficulty in using the nonplugging completion fluid emulsions has been encountered in some cases because of excessive thickening of the conventional mud at the zone of contact between the drilling mud and the emulsion. This thickening results from coagulation of clays in the mud by components of the emulsion and particularly by alkaline earth metal salts such as calcium chloride. This thickening may be so extreme as to prevent a perforating gun from dropping into place or in less severe cases, the thickening may cause difficulty in displacing the thickened mud from the hole.

This difficulty has been overcome in field practice by running a blanket of water between the emulsion and mud. However, a blanket of water has the disadvantage that the water may mix with the emulsion and damage properties of the emulsion or may cause migration of the emulsion from the point where it is spotted or located. Also, in wells of high pressure, it is sometimes unwise to place a low density fluid such as water in the well in appreciable amounts because there is always danger of blowouts.

As examples of the completion emulsions, reference is made herein to U.S. Patent 2,805,722, B. E. Morgan and G. G. Priest, "A Completion Fluid of Controlled Density"; and pending U.S. patent applications, Serial Nos. 630,266, G. G. Priest et al., "A Completion Fluid of Controlled Weight"; 630,026, G. G. Priest et al., "A Completion Fluid of Controlled Density"; 696,948, G. G. Priest, "Method of Preparing a Non-Plugging Completion Fluid." This problem of thickening of muds has been solved by improved drilling fluids of the present invention in that the improved drilling fluids are not thickened seriously by contamination with the completion emulsions described herein supra. In other words, wells may be drilled with the improved drilling fluid and then workover operations performed with the completion emulsions without causing harm by the completion emulsions to the drilling fluid.

In order to illustrate this aspect of the present invention, a Wyoming bentonite clay (sodium montmorillonite) together with Q-Broxin was dispersed in calcium chloride solution and then contacted with the completion emulsions as have been described. The base mud consisted of 20% Aquagel clay which is a bentonite, 3% Q-Broxin in 1% calcium chloride solution, and had a viscosity of 35 centipoises at 600 r.p.m. Stormer at 80° F. The filtration rate of the base mud was 7 cc. at 80° F. and 10 cc. at 180° F. in 30 minutes, API. The initial gel strength was 0 grams Stormer and the 3 minute gel strength was 50 gel Stormer. The desirable flow characteristics of this mud is indicated by the zero initial gel strength which together with lower filtration rate indicates a mud system suitable for drilling operations. Barites were added to the mud to raise its weight to 12.7 pounds per gallon.

The following Table I compares various muds with the base mud in accordance with the present invention showing the effect of the completion fluid on the mud characteristics.

*Table I*

| Composition of muds | Viscosity, cps. at 600 r.p.m., Stormer | Initial gel, grams, Stormer | 3-minute gel, grams, Stormer | Filtration rate, cc., API | Density, lb./gal. |
|---|---|---|---|---|---|
| (A) 20% Aquagel Clay, 3% Q-Broxin, 77% of 1% $CaCl_2$ solution | 35 | 0 | 50 | 7.0 | 9.6 |
| (B) (A) plus 10% of completion emulsion | 56 | 0 | 50 | 9.6 | -------- |
| (C) 10% Aquagel, 33% Baroid, 2% Q-Broxin, 55% of 1% $CaCl_2$ solution | 39 | 0 | 20 | 6.6 | 12.3 |
| (D) (C) plus 10% of completion emulsion | 98 | 15 | 190 | 35.5 | -------- |
| (E) 8.7% Diesel Oil (12% by vol.), 18.2% Aquagel, 2.7% Q-Broxin, 70.4% of 1% $CaCl_2$ solution, trace aluminum stearate | 37 | 0 | 42 | 5.1 | 9.2 |
| (F) 19.57% Aquagel, 3% Q-Broxin, 77.5% of a solution of 2% $CaCl_2$ and ½% $Na_2CO_3$ | 60 | 0 | 32 | 9.6 | 9.7 |

It will be seen from the data given in the foregoing Table I that contamination of the mud with the completion emulsion did not substantially change the filtration rate or the gel strength.

Twelve percent by volume of oil was emulsified into a typical mud as set out hereinbefore which lowered the filtration rate strongly and the presence of aluminum stearate eliminated any tendency of the mud to foam on adding the oil.

In order to illustrate the effect of Q-Broxin on filtration rate, reference is had to FIG. 2, which is a graph of data showing filtration rate plotted against Q-Broxin concentration. It will be noted that 1% of Q-Broxin showed a filtration rate of 28, whereas 2% had a filtration rate of only 15. It will be desirable, therefore, to use a Q-Broxin concentration sufficient to provide a filtration rate of less than about 20 ml.

In order to illustrate the present invention further, drilling operations were conducted in a Gulf Coastal field employing a calcium chloride containing mud in accordance with the present invention. The penetration rates obtained with this improved mud are shown in Table II where the drilling experience is divided into periods labeled I and II. During the Period I, difficulty was encountered in maintaining low viscosity; hence lower penetration rates were experienced. During Period II mud treatment had become lined out and for the most part a desirable low viscosity from about 45 to 60 seconds prevailed during the drilling operations and hence a higher penetration rate. The average rate of penetration of the drill bit during Period I was 8.2 feet per hour. In Period II, the average penetration rate was slightly higher—9.3 feet per hour, if the one slow bit is excluded, while all others were 11.2 feet per hour or higher. These data are presented in Table II which follows.

Table III

[6⅝" Hughes OSC-3J bits with 3½" nozzles. Rotary speed 50 r.p.m.; bit weight 10-12,000 lb.]

| Bit No. | Depth In | Depth Out | Footage | Hours rotated | Average penetration rate, ft./hr. |
|---|---|---|---|---|---|
| 26 | 12,000 | 12,028 | 26 | 15.5 | 1.81 |
| 27 | 12,028 | 12,123 | 95 | 29.5 | 3.22 |
| 28 | 12,123 | 12,224 | 101 | 23.5 | 4.30 |
| 29 | 12,224 | 12,327 | 103 | 23.5 | 4.38 |
| 30 | 12,327 | 12,363 | 36 | 12.0 | 3.00 |
| 31 | 12,363 | 12,468 | 105 | 29.0 | 3.62 |
| 32 | 12,468 | 12,591 | 123 | 21.5 | 5.72 |
| 33 | 12,591 | 12,672 | 81 | 19.5 | 4.15 |
| 34 | 12,672 | 12,716 | 44 | 9.0 | 4.89 |

The data from Tables II and III are presented graphically in FIG. 3, which shows the drilling experience in a different manner. Referring to FIG. 3, it will be seen that the well drilled with the improved drilling fluid progressed 2300 feet below the 12,000 foot level in 19 days, during which time three logging runs were made. The gross average penetration rate during this period was 121 feet per day. By way of comparison, a lime-treated mud progressed through 700 feet of comparable formation in 11 days for an average of 64 feet per day. One logging run was made during this interval.

It will be clear from FIG. 3 that the improved drilling mud permitted drilling at approximately twice the rate of the lime-treated mud.

In order to illustrate the use of the several alkaline earth metal salts, muds were made up employing magnesium chloride, calcium chloride, strontium chloride, and barium chloride to provide the required amount of

Table II

[8⅝" bits with 3¾" nozzles, 14.0 to 16.5 lb./gal. calcium chloride mud]

| Bit No. | Make | Type | Weight on bit, 1000 lb. | Rotary speed, r.p.m. | Depth In | Depth Out | Footage | Hours rotated | Average Penetration rate, ft./hr. |
|---|---|---|---|---|---|---|---|---|---|
| PERIOD I | | | | | | | | | |
| 23 | Hughes | OSC-35 | 18-25 | 125 | 11,940 | 12,092 | 152 | 17.00 | 9.0 |
| 24 | do | OSC-1GJ | 20-25 | 100-125 | 12,092 | 12,199 | 107 | 12.75 | 8.4 |
| 25 | do | OSC-1GJ | 20 | 90-100 | 12,199 | 12,327 | 128 | 17.00 | 7.5 |
| 26 | Reed | YT3-J | 20 | 90-110 | 12,327 | 12,495 | 168 | 18.25 | 9.2 |
| 27 | do | YT3-J | 20-25 | 100-125 | 12,495 | 12,650 | 155 | 19.75 | 7.8 |
| 28 | do | YT3-J | 20-25 | 100-125 | 12,650 | 12,880 | 230 | 24.50 | 9.4 |
| 29 | do | YT3-J | 25 | 110-125 | 12,880 | 13,001 | 121 | 16.00 | 7.6 |
| 30 | do | YT3-J | 20-25 | 100-110 | 13,001 | 13,116 | 115 | 17.75 | 6.5 |
| PERIOD II | | | | | | | | | |
| 31 | do | YT3-J | 20-25 | 100-120 | 13,116 | 13,310 | 194 | 15.50 | 12.5 |
| 32 | do | YT3-J | 25 | 120-125 | 13,310 | 13,422 | 112 | 14.25 | 7.8 |
| 33 | do | YT3-J | 20-25 | 120-125 | 13,422 | 13,506 | 84 | 7.50 | 11.2 |
| 34 | Hughes | OSC-1GJ | 25 | 100-120 | 13,506 | 13,761 | 255 | 22.00 | 11.6 |
| 35 | Reed | YT3-J | 25 | 100-125 | 13,761 | 13,958 | 197 | 17.00 | 11.6 |
| 36 | do | YT3-J | 25 | 100-120 | 13,958 | 14,121 | 163 | 13.25 | 12.3 |
| 37 | do | YT3-J | 25 | 100-110 | 14,121 | 14,330 | 209 | 18.00 | 11.6 |

In comparison with the data in Table II, the data in Table III shows a drilling operation where caustic-quebracho mud was employed as drilling fluid. In these operations the average penetration rate of the drill bit was only 3.9 feet per hour. The fastest bit drilled at only 5.7 feet per hour, slower than the slowest bit, which was 6.5 feet per hour, on the well using the calcium chloride mud in accordance with the presence invention.

alkaline earth metal ion. The base mud was made up with highly hydrated bentonite in an amount of 20 pounds per barrel; Q-Broxin, 15 pounds per barrel; sufficient alkaline earth metal salt to provide the cation in amount of 0.075 molar with sufficient amount of water to provide a mud having a density of about 375 pounds per barrel. The properties of these muds containing the various alkaline earth chlorides are set out in Table IV.

Table IV

Base mud:
Prehydrated bentonite _____ 20 lb./bbl.
Q-Broxin _____ 15 lb./bbl.
Alkaline earth cation _____ 0.075 Molar.

| Salt | Amount added, lb./bbl. | Cation added, p.p.m. | Atomic wt. cation | Plastic viscosity cp. | Yield point, lb./100 sq. ft. | pH (of mud) | API filtration cc./30 min. | API filtration Cake, 32ds |
|---|---|---|---|---|---|---|---|---|
| $MgCl_2 \cdot 6H_2O$ | 5.3 | 1,820 | 24.32 | 15 | 2 | 8.5 | 7.0 | 2 |
| $CaCl_2$ (Anhyd.) | 2.9 | 3,000 | 40.08 | 22 | 8 | 8.5 | 7.5 | 2 |
| $SrCl_2 \cdot 6H_2O$ | 7.0 | 6,570 | 87.63 | 21 | 6 | 8.55 | 8.0 | 2 |
| $BaCl_2 \cdot 2H_2O$ | 6.4 | 10,300 | 137.63 | 32 | 10.5 | 8.55 | 8.5 | 2 |

Examination of the data shows that all of the muds have a pH of about 8.5 and a very low filtration rate, which shows a satisfactory mud system. Further, the alkaline earth cation indicates that about 1800 p.p.m. for the magnesium chloride provides a satisfactory mud. The fact of the matter is that the magnesium chloride mud was the most fluid. All of the muds had a maximum initial yield point of about 1 pound per 100 square feet and a 10 minute yield point of 10.5 pounds per 100 square feet. The magnesium chloride containing mud had a 10 minute yield point of 2 pounds per 100 square feet. From these data, it is clear that the several alkaline earth metal salts may be used in the present invention. However, calcium chloride is preferred.

As further evidence of the desirable gel strength characteristics of the improved mud in drilling operations at the 14,000 foot level in the well drilling operation described herein, a pressure of only 650 pounds per square inch was required to initiate circulation after a round trip had been made to change the bit. This is considered quite desirable in that field experience indicates that pressure below 1,000 pounds per square inch for this depth is desirable. These data show that the gel strength of the mud developed over a long period of time, 8 to 10 hours, and was not excessive.

In these operations, the drilling crews observed the flow characteristics of the mud as it flows down the ditch from the mud flow lines such as shown in FIG. 1 and indicated by numeral 21. At the time the observation was made, the funnel viscosity of the mud was 60 to 65 seconds; yet the observation was that the mud flowed down the ditch like 45-second mud. The mobility of the mud may be attributed to a rapid early buildup in gel strength, to which the funnel viscosity measurement is sensitive. As pointed out hereinbefore, this is an extremely desirable characteristic of the mud, as suspension of weighting material is dependent upon the early increase in gel strength.

When initiating circulation after suspension of circulation during a round trip, foaming was encountered with the improved mud and the addition of kerosene to the system seemed to aggravate the foaming problem. The addition of 50 pounds of aluminum stearate mixed in five gallons of kerosene and added to the 1100 barrel mud system during the course of one circulation over about 2½ hours was effective not only in eliminating the foam at the time, but also prevented foam buildup for another two weeks. During the 3½ week period during which the drilling operations with the improved fluid were employed, a total of about 100 pounds of aluminum stearate was used and foaming was never a serious problem.

It is to be pointed out that the mud exemplified in Table I was a mud containing about 70 pounds of clay per barrel and is suitable in workover operations where nonplugging fluids are used whereas the muds employed in the drilling operations contained about 20 pounds of clay per barrel and is suitable, as shown, for drilling operations. However, certain conditions may demand amounts of clay throughout the range given supra either in workover, completion servicing, or in drilling operations as may be desired.

In the practice of the present invention, the addition of oil to the circulating drilling mud in an amount of about 10% by volume improved filtration characteristics and did not deteriorate the flow characteristics.

The present invention is quite advantageous and useful and provides a new and improved composition suitable for use in well drilling and completion operations. Furthermore, the improved composition, when used in drilling wells, not only controls the gauge of the well, but allows drilling rates to be enhanced. This is important in maintaining straight holes and obtaining the high rates of drilling.

The present invention is quite advantageous and useful in that the fresh water bentonitic muds heretofore used in wells have several disadvantages. For example, the clays in the drilled formations tend to disperse which increases the solids content and viscosity of the mud. Their rheological properties are quite sensitive to electrolyte content and are adversely affected when the mud is contaminated with salt water, gypsum or cement. Also, the filtrate from fresh water muds may markedly reduce permeability of formations which have bentonites as part of the native clays. Various special mud systems have been used which are not subject to one or more of the disadvantages of the fresh water bentonite system but no currently-used mud alleviates all the difficulties. The mud in accordance with the present invention overcomes and alleviates the disadvantages of the prior art muds and, as has been shown herein, has markedly superior properties and allows obtaining of unexpectedly superior results.

This application contains subject matter common to an application filed October 10, 1958, Serial No. 766,511, now abandoned, for Patrick H. Monaghan, entitled "Preparation of Drilling Fluid and Drilling Therewith."

The nature and objects of the present invention having been completely described and illustrated, what we wish to claim as new and useful and secure by Letters Patent is:

1. A composition suitable for use in wells consisting essentially of a suspension of clay, an aqueous solution containing a water-soluble salt of an alkaline earth metal in a sufficient amount to provide in said composition an amount of alkaline earth metal ion from 1800 p.p.m. to about 40,000 p.p.m., and an amount of ferro-chrome lignosulfonate within the range from about 5 to about 20 pounds per barrel sufficient to provide said composition with an API filtration rate of less than about 20 ml., said composition having a pH within the range from about 7.5 to about 10.0 and a density within the range from about 8 to about 18 pounds per gallon.

2. A composition in accordance with claim 1 in which the alkaline earth metal is calcium.

3. A composition in accordance with claim 1 in which the alkaline earth metal is magnesium.

4. A composition in accordance with claim 1 in which the alkaline earth metal is barium.

5. A composition in accordance with claim 1 in which the alkaline earth metal is strontium.

6. A composition suitable for use in wells consisting essentially of a suspension of clay, an aqueous solution containing calcium chloride in a sufficient amount to provide in said composition an amount of calcium ion from 2000 p.p.m. to about 40,000 p.p.m., and an amount of ferro-chrome lignosulfonate within the range from about 5 to about 20 pounds per barrel sufficient to provide said composition with an API filtration rate of less than about 20 ml., said composition having a pH within the range from about 7.5 to about 10.0 and a density within the range from about 8 to about 18 pounds per gallon.

7. A composition in accordance with claim 6 which contains from about 5% to about 15% by volume of oil.

8. A composition suitable for use in wells consisting essentially of a suspension of bentonitic clay, an aqueous solution containing calcium chloride in a sufficient amount to provide in said composition an amount of calcium ion from 2000 p.p.m., to about 40,000 p.p.m. and an amount of ferro-chrome lignosulfonate within the range from about 5 to about 20 pounds per barrel sufficient to provide said composition with an API filtration rate of less than about 20 ml., said composition having a pH within the range from about 7.5 to about 10.0 and a density within the range from about 8 to about 18 pounds per gallon, the bentonitic clay being present in an amount within the range from about 7 to about 70 pounds per barrel.

9. A composition suitable for use in wells consisting essentially of a suspension of bentonitic clay, an aqueous solution containing calcium chloride in a sufficient amount to provide in said composition an amount of calcium ion from 2000 p.p.m., to about 40,000 p.p.m. and an amount of ferro-chrome lignosulfonate within the range from about 5 to about 20 pounds per barrel sufficient to provide said composition with an API filtration rate of less than about 20 ml., said composition containing from about 5% to about 15% by volume of oil and having a pH within the range from about 7.5 to about 10.0 and a density within the range from about 8 to about 18 pounds per gallon, the bentonitic clay being present in an amount within the range from about 7 to about 70 pounds per barrel, and said composition containing a sufficient amount of a foam-suppressing agent.

10. A composition in accordance with claim 9 in which foam-suppressing agent is aluminum stearate.

11. A composition suitable for use in wells consisting essentially of a suspension of clay, an aqueous solution containing water soluble salt of an alkaline earth metal in a sufficient amount to provide in said composition an amount of alkaline earth metal ion from 2000 p.p.m. to about 40,000 p.p.m. and an amount of ferro-chrome lignosulfonate within the range from about 5 to about 20 pounds per barrel sufficient to provide said composition with an API filtration rate of less than about 20 ml., said composition having a pH within the range from about 7.5 to about 10.0 and a density within the range from about 8 to about 18 pounds per gallon, said clay being present in an amount within the range from about 7 to about 70 pounds per barrel.

12. A composition suitable for use in wells consisting essentially of a suspension of clay, an aqueous solution containing water soluble salt of an alkaline earth metal in a sufficient amount to provide in said composition an amount of alkaline earth metal ion from 1800 p.p.m. to about 40,000 p.p.m. and an amount of ferro-chrome lignosulfonate within the range from about 5 to about 20 pounds per barrel sufficient to provide said composition with an API filtration rate of less than about 20 ml., said composition containing from about 5% to about 15% by volume of oil and having a pH within the range from about 7.5 to about 10.0 and a density within the range from about 8 to about 18 pounds per gallon, said clay being present in an amount within the range from about 7 to about 70 pounds per barrel, and said composition containing a sufficient amount of a foam suppressing agent.

13. A method for drilling a well which consists of forming a fluid consisting essentially of a suspension of clay, an aqueous solution containing a water-soluble salt of an alkaline earth metal in a sufficient amount to provide in said fluid an amount of alkaline earth metal ion from 1800 p.p.m., to about 40,000 p.p.m. and an amount of ferrochrome lignosulfonate within the range from about 5 to about 20 pounds per barrel sufficient to provide said fluid with an API filtration rate of less than about 20 ml., said fluid having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced.

14. A method in accordance with claim 13 in which the alkaline earth metal is calcium.

15. A method in accordance with claim 13 in which the alkaline earth metal is magnesium.

16. A method in accordance with claim 13 in which the alkaline earth metal is barium.

7. A method in accordance with claim 13 in which the alkaline earth metal is strontium.

18. A method for drilling a well which consists of forming a fluid consisting essentially of a suspension of cally, an aqueous solution containing calcium chloride in a sufficient amount to provide in said fluid an amount of calcium ion from 2000 p.p.m., to about 40,000 p.p.m. and an amount of ferro-chrome lignosulfonate within the range from about 5 to about 20 pounds per barrel sufficient to provide said fluid with an API filtration rate of less than about 20 ml., said fluid having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced.

19. A method in accordance with claim 18 in which the fluid contains from about 5% to about 15% by volume of oil.

20. A method for drilling a well which consists of forming a fluid consisting essentially of a suspension of bentonitic clay, an aqueous solution containing calcium chloride in a sufficient amount to provide in said fluid an amount of calcium ion from 2000 p.p.m. to about 40,000 p.p.m. and an amount of ferro-chrome lignosulfonate within the range from about 5 to about 20 pounds per barrel sufficient to provide said fluid with an API filtration rate of less than about 20 ml., said fluid having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced, the bentonitic clay being present in the fluid in an amount within the range from about 7 to about 70 pounds per barrel.

21. A method for drilling a well which consists of forming a fluid consisting essentially of a suspension of bentonitic clay, an aqueous solution containing calcium chloride in a sufficient amount to provide in said fluid an amount of calcium ion from 2000 p.p.m. to about 40,000 p.p.m., and an amount of ferro-chrome lignosulfonate within the range from about 5 to about 20 pounds per barrel sufficient to provide said fluid with an API filtration rate of less than about 20 ml., said fluid containing from about 5% to about 15% by volume of oil and having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced, the bentonitic clay being present in the fluid in an amount within the range from about 7 to about 70 pounds per barrel, said fluid also containing a sufficient amount of a foam-suppressing agent.

22. A method in accordance with claim 21 in which the foam-suppressing agent is aluminum stearate.

23. A method for drilling a well which consists of forming a fluid consisting essentially of a suspension of clay, an aqueous solution containing a water soluble salt of an alkaline earth metal in a sufficient amount to provide in said fluid an amount of alkaline earth metal ion from 1800 p.p.m. to about 40,000 p.p.m., and an amount of ferro-chrome lingnosulfonate within the range from about 5 to about 20 pounds per barrel sufficient to provide said fluid with an API filtration rate of less than about 20 ml., said fluid having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced, said clay being present in the fluid in an amount within the range from about 7 to about 70 pounds per barrel.

24. A method in accordance with claim 23 in which oil and a foam-suppressing agent are added to the fluid during circulation.

25. A method for drilling a well which consists of forming a fluid consisting essentially of a suspension of clay, an aqueous solution containing a water soluble salt of an alkaline earth metal in a sufficient amount to provide in said fluid an amount of alkaline earth metal ion from 1800 p.p.m. to about 40,000 p.p.m., and an amount of ferro-chrome lignosulfonate within the range from about 5 to about 20 pounds per barrel sufficient to provide said fluid with an API filtration rate of less than 20 ml., said fluid containing from about 5% to about 15% by volume of oil and having a pH within the range from about 7.5 to about 10 and a density within the range from about 8 to about 18 pounds per gallon, and introducing and circulating said fluid in said well while drilling said well whereby enlargement of the bore of said well is suppressed and drilling rate is enhanced, said clay being present in said fluid in an amount within the range from about 7 to about 70 pounds per barrel, and containing a sufficient amount of a foam-suppressing agent.

26. A water base drilling fluid consisting essentially of a suspension of clay, an aqueous solution containing a water soluble salt of a divalent metal selected from the group consisting of calcium, barium, and magnesium in an amount sufficient to yield a divalent metal ion concentration of at least 2,000 parts per million and ferro-chrome lingnosulfonate in an amount within the range of about 5 to about 20 pounds per barrel, said drilling fluid having a pH within the range from about 7.5 to about 10.

References Cited in the file of this patent

UNITED STATES PATENTS

| | | |
|---|---|---|
| 2,371,955 | Dawson | Mar. 20, 1945 |
| 2,491,436 | Barnes | Dec. 13, 1949 |
| 2,802,783 | Weiss et al. | Aug. 13, 1957 |
| 2,805,722 | Morgan et al. | Sept. 10, 1957 |
| 2,856,154 | Weiss et al. | Oct. 14, 1958 |
| 2,856,355 | Weiss et al. | Oct. 14, 1958 |
| 2,856,356 | Weiss et al. | Oct. 14, 1958 |
| 2,856,357 | Weiss et al. | Oct. 14, 1958 |
| 2,868,726 | Brukner et al. | Jan. 13, 1959 |
| 2,871,189 | Brukner et al. | Jan. 27, 1959 |
| 2,935,504 | King et al. | May 3, 1960 |

OTHER REFERENCES

Rogers: Composition and Properties of Oil Well Drilling Fluids, Revised Edition, published 1953 by the Gulf Publishing Co. of Houston, Texas, pages 437, 438 and 445.